United States Patent
Tian

(10) Patent No.: US 12,122,414 B2
(45) Date of Patent: Oct. 22, 2024

(54) ROAD SEGMENT SPATIAL EMBEDDING

(71) Applicant: GM Cruise Holdings LLC, San Francisco, CA (US)

(72) Inventor: Feng Tian, Foster City, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 295 days.

(21) Appl. No.: 17/698,758

(22) Filed: Mar. 18, 2022

(65) Prior Publication Data

US 2023/0294728 A1 Sep. 21, 2023

(51) Int. Cl.
*B60W 60/00* (2020.01)

(52) U.S. Cl.
CPC ....... *B60W 60/001* (2020.02); *B60W 2552/00* (2020.02); *B60W 2554/4029* (2020.02); *B60W 2554/4042* (2020.02); *B60W 2554/406* (2020.02)

(58) Field of Classification Search
CPC ............ B60W 40/06; B60W 50/0097; B60W 60/001; B60W 2552/00; B60W 2552/05; B60W 2552/45; B60W 2554/406; B60W 2554/4029; B60W 2554/4042; G08G 1/0104; G08G 1/0129; G08G 1/052; G08G 1/065
See application file for complete search history.

(56) References Cited

U.S. PATENT DOCUMENTS

| | | | | |
|---|---|---|---|---|
| 10,479,356 | B1* | 11/2019 | Haque | B60W 40/06 |
| 2009/0070025 | A1* | 3/2009 | Kumagai | G08G 1/0116 |
| | | | | 701/117 |
| 2017/0285181 | A1* | 10/2017 | Zheng | G08G 1/065 |
| 2022/0343756 | A1* | 10/2022 | Chen | G06N 3/044 |

FOREIGN PATENT DOCUMENTS

CN 109598936 A * 4/2019 ........... G08G 1/0129

OTHER PUBLICATIONS

English translation of CN 109598936 (Year: 2019).*

* cited by examiner

*Primary Examiner* — Russell Frejd
*Assistant Examiner* — Brandon Z Willis
(74) *Attorney, Agent, or Firm* — Michael DiCato

(57) ABSTRACT

The subject disclosure relates to techniques for enabling autonomous vehicles to reason about similarities of features between drivable areas. A process of the disclosed technology can include receiving first sensor data corresponding with a first roadway segment, receiving second sensor data corresponding with a second roadway segment, encoding the first sensor data into a first vector, wherein the first vector represents a first roadway characteristic associated with the first roadway segment, encoding the second sensor data into a second vector, wherein the second vector represents a second roadway characteristic associated with the second roadway segment, and determining a similarity between the first roadway segment and the second roadway segment based on the first vector and the second vector.

18 Claims, 5 Drawing Sheets

ROAD SEGMENT SPATIAL EMBEDDING

BACKGROUND

1. Technical Field

The subject technology provides solutions for enabling autonomous vehicles to reason about similarities between drivable areas, and more particularly to, encode sensor data into vectors representing roadway characteristics and determining similarities between roadway segments based on the vectors.

2. Introduction

Autonomous vehicles operate without human drivers. As autonomous vehicles navigate streets, the autonomous vehicles are unable to understand similarities between streets. Even at the fleet level, autonomous vehicles are not aware of similarities and differences between streets.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
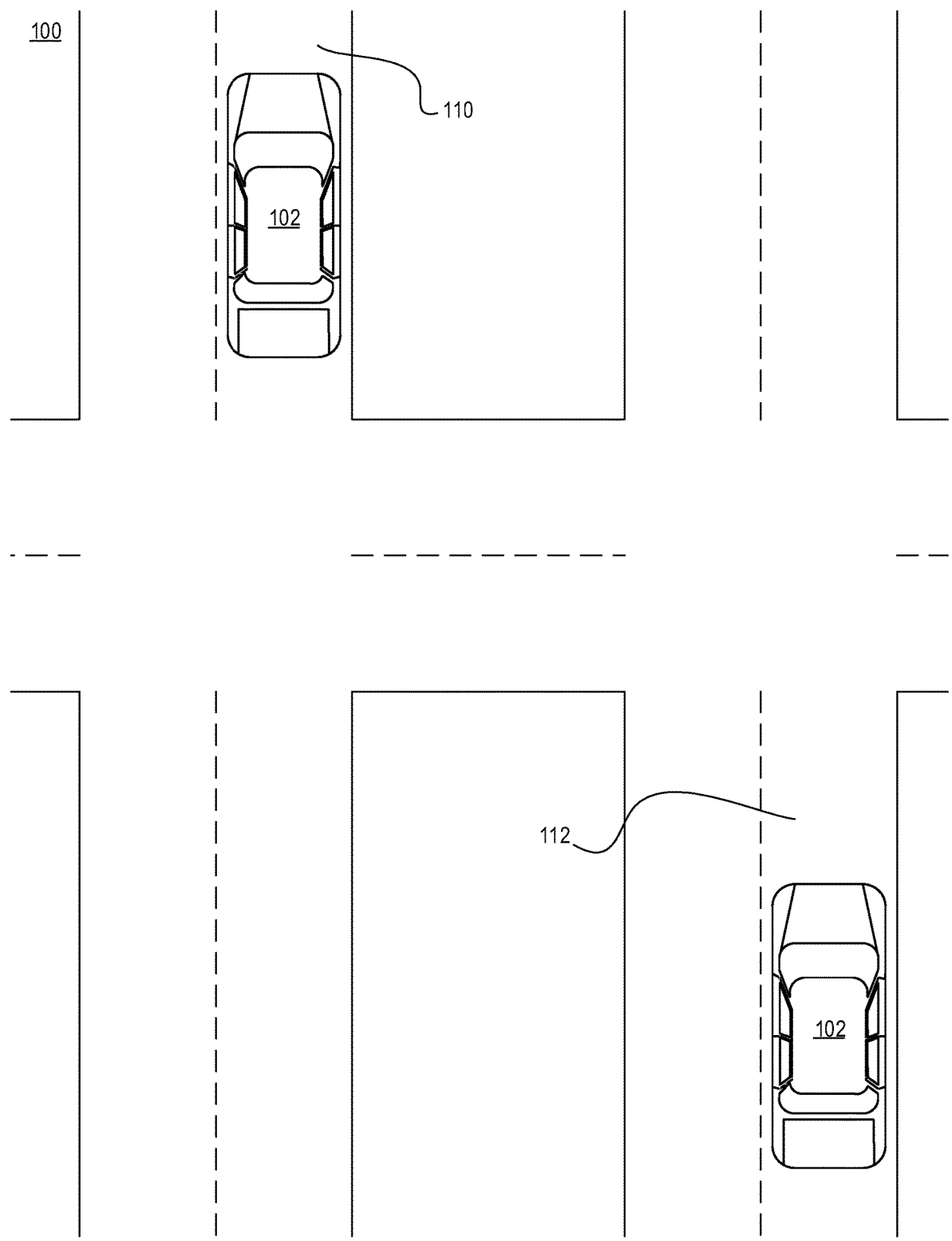
FIG. 1 illustrates an environment having autonomous vehicles navigating roadways.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Humans can generally understand similarities and differences between different roadway areas, such as streets. For example, humans can easily understand similarities (or differences) between different streets with respect to certain characteristics, such as traffic density, pedestrian density, and other dynamic features throughout the day. However, autonomous vehicles (AVs) are not able to reason about such similarities. Even at the fleet level, AVs are not currently aware of how these features may relate between streets. For example, Market St. and Mission St. may both be equally crowded because they are proximate to each other, but the AVs would not understand these dynamic features.

As a result, conventional AVs are unable to utilize the similar features of various drivable areas. For example, conventional AVs would be unable to determine similar paths having similar density of vehicles or traffic. Similarly, conventional AVs would not be able to select similar roads for testing when a specific road is unavailable. For example, Market St. may be closed for construction, but historically Mission St. demonstrated high similarities in traffic speed, traffic density, etc. However, conventional AVs would not be able to recognize that Mission St. would be a close alternative or similar street and, thus, would not select Mission St. as an alternative.

Aspects of the disclosed technology provide solutions to enable AVs to better reason about similarities (and differences) between different drivable areas, such as between different streets, and/or between different roadway and/or lane segments.

Drivable areas (e.g., roadways, road segments, and/or lane segments) can be characterized based on their detected characteristics, and compared, e.g., to determine similarities (or differences) over time.

The characterization of a roadway and/or road/lane segment can be based on collected sensor data that is associated with the respective road/lane segment. For example, sensor data may be collected using AV sensors, that can be used as a "moving sensor" to collect data about each road segment in a time-series (e.g., that can be used to identify/determine various characteristics of the associated road segment, such as the velocity/density of vehicles, and/or velocity/density of pedestrians, density of vehicles and pedestrians, short term driving conditions, construction zones, etc.).

In some aspects, characteristics about a given roadway, street, or road segment can be quantified in a vector (or matrix) representation. For example, roadway characteristics can be quantified into a vector in a database. The vector(s) can then be used to query similar road segments and other manipulations (e.g., a vector-vector dot product). Additionally, a vector encoder can be created and used to extract the features or data of the vector.

In some aspects, roadways can be segmented based on dynamic features, such as density, number of objects (e.g., stops, stores, trees, any non-decreasing number, etc.), speed limits, etc. In other words, segments can be determined based on characteristics of the road (e.g., distance, speed limit, etc.) or behavior (e.g., specified number of braking maneuvers, turns, etc.).

Thus, the disclosed technology enables AVs to reason about similarities and differences between different drivable areas, which in turn enables AVs to utilize these different drivable areas when a need arises. Continuing the example above, when Market St. is closed for construction, the AVs of the disclosed technology will be able to determine that Mission St. is a suitable alternative for usage when Market St. is unavailable.

FIG. 1 illustrates an environment 100 having autonomous vehicles 102 navigating along roadways 110, 112. As autonomous vehicles 102 navigate roadways 110, 112, sensors of each autonomous vehicle 102 can perceive roadways 110, 112 and store features or characteristics associate with the respective roadway as sensor data.

The sensor data can include characteristics about each roadway and/or road segment. For example, the sensor data can include traffic density, a number of vehicles on the roadway or road segment, speed or velocity of vehicles or traffic, pedestrian density, a number of pedestrians on sidewalks associated with the roadway or road segment, and other dynamic features throughout the day.

In some embodiments, the sensor data can be segmented based on road segments of each roadway 110, 112. More specifically, each roadway can be segmented into one or more road segments to provide more granular detail of each road segment. For example, a road segment can be a predetermined or predefined distance or length of a roadway (e.g., each road segment is one block). In some embodiments, road segments can be defined or determined based on dynamic features, such as density or number of objects (e.g., stops, stores, trees, any non-decreasing number, etc.), speed limits, etc. For example, a road segment can continue until there is a change in speed limit or for a specified number of stores, etc. In some embodiments, road segments can be defined or determined based on behavior of actors on the road (e.g., a number of braking maneuvers performed by the autonomous vehicle, a number of turns, etc.). Thus, road segments can be determined or defined based on characteristics of the road (e.g., distance, speed limit, etc.) or behavior of actors on the road (e.g., braking maneuvers, turns, etc.).

It is also contemplated that the sensor data can also include timestamp information to identify and/or associate the sensor data with the respective time of obtainment. In other words, the timestamp information can identify sensor data obtained by sensors of a specific autonomous vehicle during a specific time and/or day. Thus, the sensor data can be segmented into segmented sensor data based on road segments obtained during a specific time and/or day. For example, sensor data received from an autonomous vehicle 102 traversing Market St. on Tuesday from 5 PM until 5:30 PM can be stored as a first segment of Market St. on Tuesday at 5 PM and a second segment of Market St. at 5:15 PM.

Figure 2:
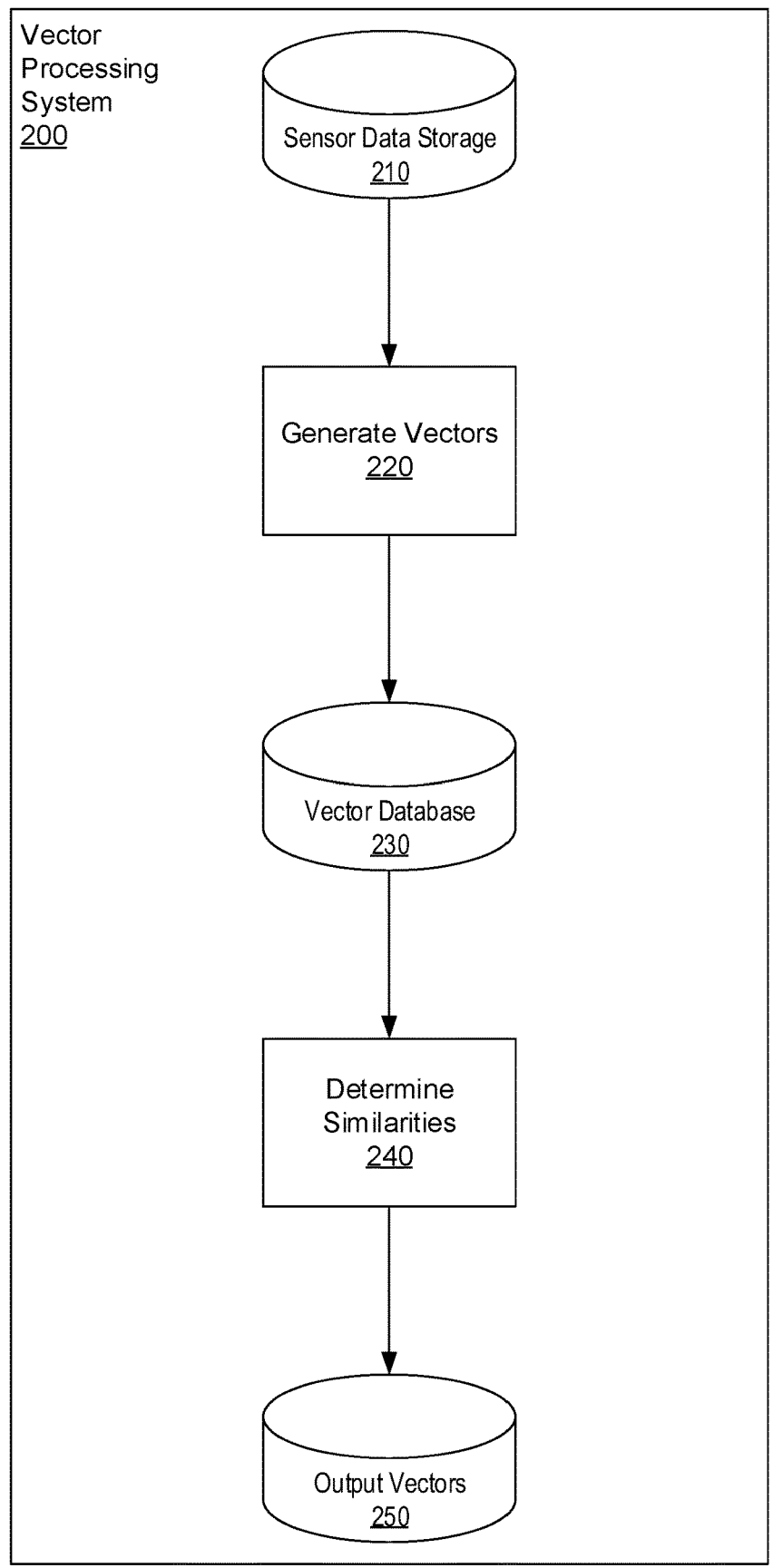
FIG. 2 illustrates an example of a system for processing sensor data associated with roadways.

FIG. 2 illustrates an example vector processing system 200. Vector processing system 200 can include a sensor data storage 210, a vector database 230, and output vectors 250. Additionally, vector processing system 200 is configured to generate vectors 220 and determine similarities 240 between vectors generated in processing step 220 and stored in vector database 230.

Sensor data storage 210 can store sensor data received from one or more autonomous vehicles (e.g., autonomous vehicles 102 as discussed above with respect to FIG. 1). Sensor data storage 210 can store the sensor data either whole and/or in segments as discussed above (e.g., segmented sensor data associated with each roadway segment).

Generate vectors 220 is a process that vector processing system 200 is configured to perform. More specifically, vector processing system 200 can generate vectors 220 based on the sensor data stored in sensor data storage 210. Furthermore, vector processing system 200 can extract the features or characteristics of each roadway or road segment in the sensor data and generate vectors representing the characteristics as parameters of the vectors. For example, the sensor data for Market St. at 5 PM on Tuesday can be used to encode characteristics for the associated road segment at the time of data collection; for example characteristics such as vehicle density, pedestrian density, and other characteristics, can be encoded as parameters in the resulting vector. Vector processing system 200 is configured to extract the vehicle density, pedestrian density, and other characteristics and generate a vector identifying Market St. at 5 PM on Tuesday and include the characteristics as additional parameters for the vector. Thus, each vector is representative of at least one roadway characteristic of a road or road segment at a given time. As AVs continue navigating and collecting data associated with roadways, each moment in time can be additional data. In other words, the data can be used to generate vectors in a time series, all of which can be used to calculate more derived features from the time series. For example, the vectors in the time series can be used to generate an average to smooth the feature values (e.g., average velocity of vehicles over the time series). Additionally, the vectors in the time series can facilitate cross correlation with other road segments to find similarities or differences along different time domains.

Vector database 230 can store the vectors generated by process 220 performed by vector processing system 200. In some embodiments, vector database 230 can be a simple database storing the vectors. In some embodiments, vector database 230 can be a matrix configured to store the vectors. In some embodiments, vector database 230 can index or store vectors based on location (e.g., geographical location of a road or road segment) and time (e.g., a given time on a given day or date).

Determine similarities 240 is a process that vector processing system 200 is configured to perform. More specifically, vector processing system 200 can determine similarities and/or differences between vectors stored in vector database 230. In some embodiments, determining similarities 240 includes comparing parameters of vectors. For example, a vector for Market St. at 5 PM can be compared against a vector for Mission St. at 3 PM. By comparing the parameters of the vectors for each street, vector processing system 200 can determine similarities and differences between the characteristics of Mission St. and Market St. at the given times. In some embodiments, the vectors can be clustered based on similarities. For example, vectors can be clustered based on similarities in pedestrian density despite occurring in different geographical locations and different times. In some embodiments, the vectors can be manipulated to determine the similarities or differences. For example, vectors can be used in a vector-vector dot product to determine similarities or differences.

A user may query vector database 230 for streets that may be similar to another street. For example, a user may be interested in knowing what streets perform similar to Market St. at 5 PM on Tuesday. Vector processing system 200 can determine similarities 240 based on the above process and output vectors 250.

In other words, output vectors 250 can store vectors that are to be output for usage. The output vectors 250 can include some or all of the vectors that satisfy the query requested by the user. Vector processing system 200 can then output the vectors stored in output vectors 250.

Figure 3:
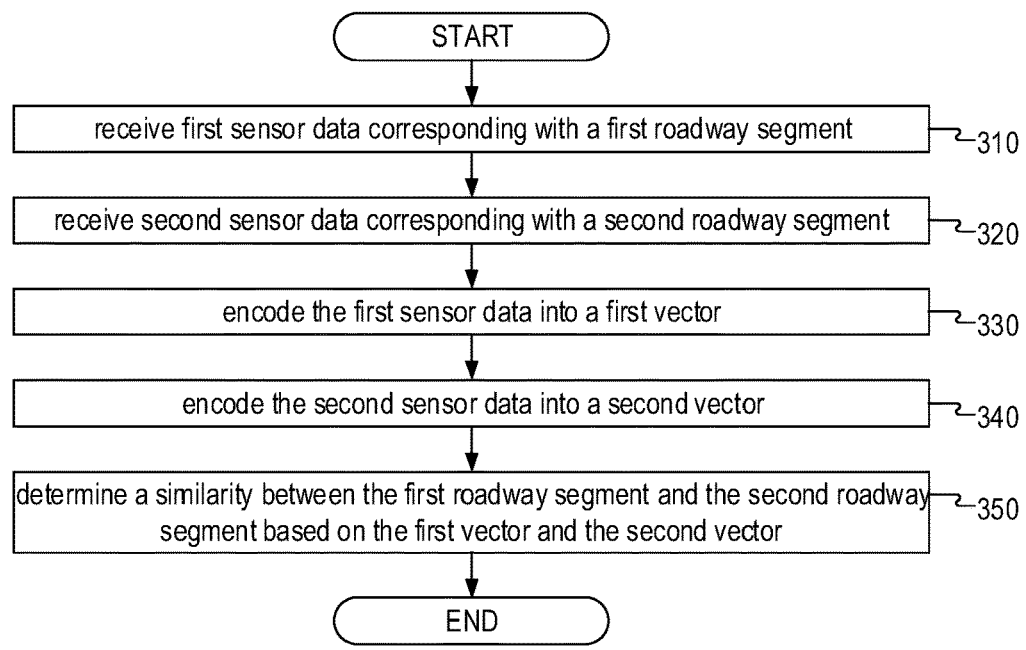
FIG. 3 illustrates an example method for enabling autonomous vehicles to reason about similarities of features between drivable areas in accordance with some examples.

FIG. 3 illustrates an example method 300 for enabling autonomous vehicles to reason about similarities of features between drivable areas. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

In some embodiments, method 300 includes receiving first sensor data corresponding with a first roadway segment at step 310. For example, vector processing system 200 illustrated in FIG. 2 may receive first sensor data corresponding with a first roadway segment.

In some embodiments, method 300 includes receiving second sensor data corresponding with a second roadway segment at step 320. For example, vector processing system 200 illustrated in FIG. 2 may receive second sensor data corresponding with a second roadway segment. In some embodiments, both the first sensor data and the second sensor data are perceived by sensors of an autonomous vehicle. In some embodiments, the first sensor data is perceived by sensors of a first autonomous vehicle and the second sensor data is perceived by sensors of a second autonomous vehicle.

In some embodiments, method 300 includes encoding the first sensor data into a first vector at step 330. For example, vector processing system 200 illustrated in FIG. 2 may encode the first sensor data into a first vector. In some embodiments, the first roadway characteristic includes at least one of velocity of vehicles on the first roadway segment, density of vehicles on the first roadway segment, velocity of pedestrians on the first roadway segment, and density of vehicles on the first road segment. In some embodiments, the first roadway characteristic is associated with timestamp information. In some embodiments, the first vector represents a first roadway characteristic associated with the first roadway segment. In some embodiments, the first vector includes timestamp information.

In some embodiments, method 300 includes encoding the second sensor data into a second vector at step 340. For example, vector processing system 200 illustrated in FIG. 2 may encode the second sensor data into a second vector. In some embodiments, the second vector represents a second roadway characteristic associated with the second roadway segment.

In some embodiments, method 300 includes determining a similarity between the first roadway segment and the second roadway segment based on the first vector and the second vector at step 350. For example, vector processing system 200 illustrated in FIG. 2 may determine a similarity between the first roadway segment and the second roadway segment based on the first vector and the second vector. In some embodiments, determining the similarity between the first roadway segment and the second roadway segment includes clustering the first vector and the second vector. In some embodiments, determining the similarity between the first roadway segment and the second roadway segment can include various vector manipulations. For example, vector-vector dot products can be used between or among vectors to determine similarities between roadway segments. As another example, maximum absolute differences, mean absolute differences, mean squared differences, and other vector manipulations can be used to determine similarities between vectors.

The determined vectors with similarities can then be output to and used by other systems. For example, the determined vectors can be used in a planning stack or route planning system to facilitate autonomous vehicles to navigate roadways associated with the determined vectors. For example, a similar roadway associated with a determined vector can be selected by users to test performance of an autonomous vehicle on a roadway having specified parameters (e.g., a desired traffic or pedestrian density). The autonomous vehicle can then navigate the roadway associated with the determined vector. As another example, a planning system may be searching for alternative routes instead of a specific roadway (e.g., due to unusually high traffic for the specific roadway). The determined vector may be associated with a roadway that has parameters similar to the typical parameters of the specific roadway (e.g., typical traffic instead of the unusually high traffic). The determined vector can then be used to cause the autonomous vehicle to navigate the roadway associated with the determined vector (e.g., to navigate the vehicle through typical traffic instead of the unusually high traffic).

Figure 4:
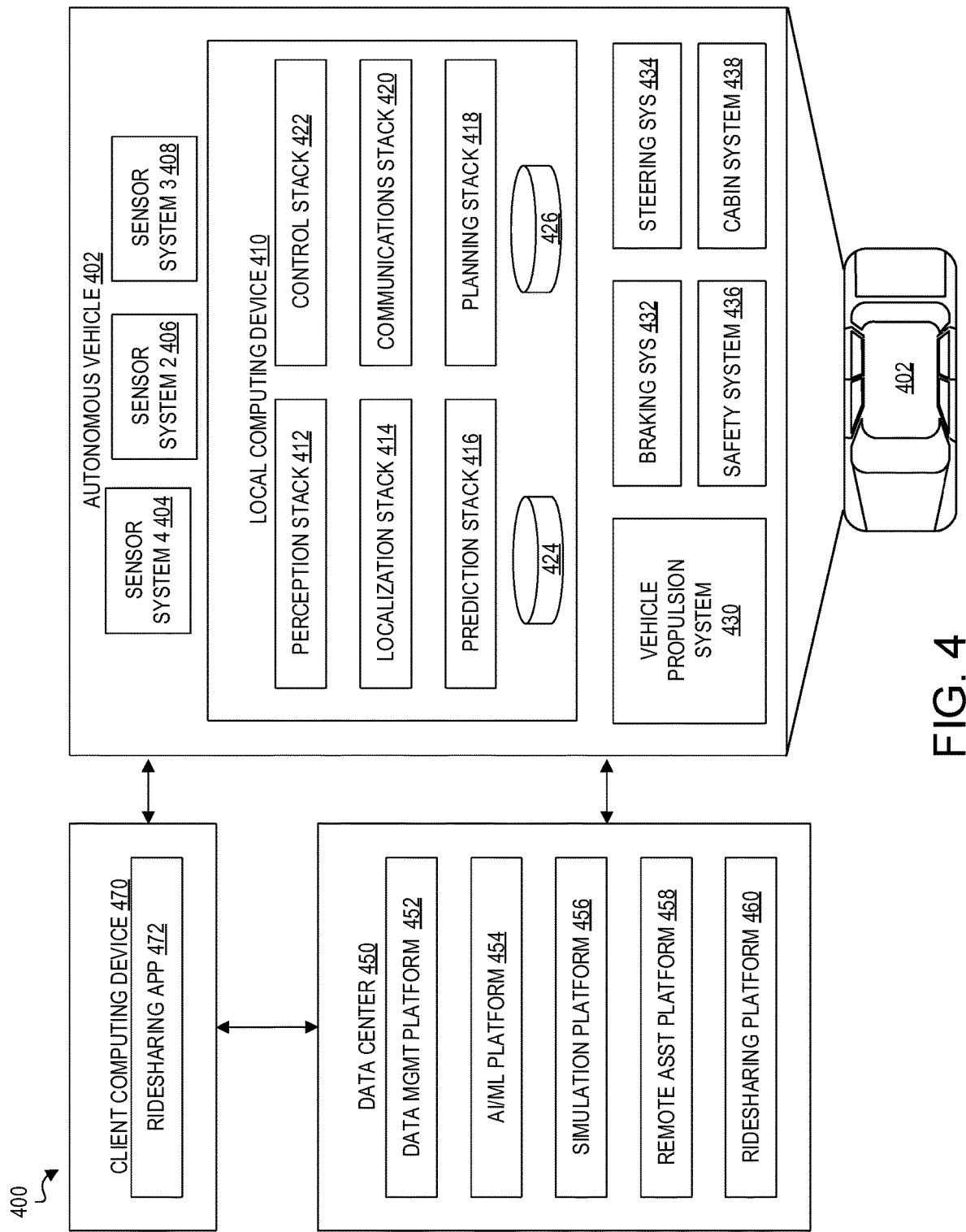
FIG. 4 illustrates an example of a system for managing one or more Autonomous Vehicles (AVs) in accordance with some aspects of the present technology.

FIG. 4 illustrates an example of an autonomous vehicle (AV) management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 402 can navigate roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., light detection and ranging (LIDAR) systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

The AV 402 can also include several mechanical systems that can be used to maneuver or operate the AV 402. For instance, the mechanical systems can include a vehicle propulsion system 430, a braking system 432, a steering system 434, a safety system 436, and a cabin system 438, among other systems. The vehicle propulsion system 430 can include an electric motor, an internal combustion engine, or both. The braking system 432 can include an engine brake, brake pads, actuators, and/or any other suitable componentry configured to assist in decelerating the AV 402. The steering system 434 can include suitable componentry configured to control the direction of movement of the AV 402 during navigation. The safety system 436 can include lights and signal indicators, a parking brake, airbags, and so forth. The cabin system 438 can include cabin temperature control systems, in-cabin entertainment systems, and so forth. In some embodiments, the AV 402 might not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

The AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a prediction stack 416, a planning stack 418, a communications stack 420, a control stack 422, an AV operational database 424, and a high definition (HD) geospatial database 426, among other stacks and systems.

The perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 426, other components of the AV, and other data sources (e.g., the data center 450, the client computing device 470, third party data sources, etc.). The perception stack 412 can detect and classify objects and determine their current locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 414 can determine the AV's position and orientation (pose) using different methods from multiple systems (e.g., GPS, IMUs, cameras, LIDAR, RADAR, ultrasonic sensors, the HD geospatial database 426, etc.). For example, in some embodiments, the AV 402 can compare sensor data captured in real-time by the sensor systems 404-408 to data in the HD geospatial database 426 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The prediction stack 416 can receive information from the localization stack 414 and objects identified by the perception stack 412 and predict a future path for the objects. In some embodiments, the prediction stack 416 can output several likely paths that an object is predicted to take along with a probability associated with each path. For each predicted path, the prediction stack 416 can also output a range of points along the path corresponding to a predicted location of the object along the path at future time intervals along with an expected error value for each of the points that indicates a probabilistic deviation from that point.

The planning stack 418 can determine how to maneuver or operate the AV 402 safely and efficiently in its environment. For example, the planning stack 418 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another and outputs from the perception stack 412, localization stack 414, and prediction stack 416. The planning stack 418 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 418 can select from multiple backup plans to carry out. For example, while preparing to change lanes to turn right at an intersection, another vehicle may aggressively cut into the destination lane, making the lane change unsafe. The planning stack 418 could have already determined an alternative plan for such an event. Upon its occurrence, it could help direct the AV 402 to go around the block instead of blocking a current lane while waiting for an opening to change lanes.

The control stack 422 can manage the operation of the vehicle propulsion system 430, the braking system 432, the steering system 434, the safety system 436, and the cabin system 438. The control stack 422 can receive sensor signals from the sensor systems 404-408 as well as communicate with other stacks or components of the local computing device 410 or a remote system (e.g., the data center 450) to effectuate operation of the AV 402. For example, the control stack 422 can implement the final path or actions from the multiple paths or actions provided by the planning stack 418. This can involve turning the routes and decisions from the planning stack 418 into commands for the actuators that control the AV's steering, throttle, brake, and drive unit.

The communications stack 420 can transmit and receive signals between the various stacks and other components of the AV 402 and between the AV 402, the data center 450, the client computing device 470, and other remote systems. The communications stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 420 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 426 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408, stacks 412-422, and other components of the AV 402 and/or data received by the AV 402 from remote systems (e.g., the data center 450, the client computing device 470, etc.). In some embodiments, the raw AV data can include HD LIDAR point cloud data, image data, RADAR data, GPS data, and other sensor data that the data center 450 can use for creating or updating AV geospatial data or for creating simulations of situations encountered by AV 402 for future testing or training of various machine learning algorithms that are incorporated in the local computing device 410.

The data center 450 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and the client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, and a ridesharing platform 460, among other systems.

The data management platform 452 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to pick up or drop off from the ridesharing application 472 and dispatch the AV 402 for the trip.

Figure 5:
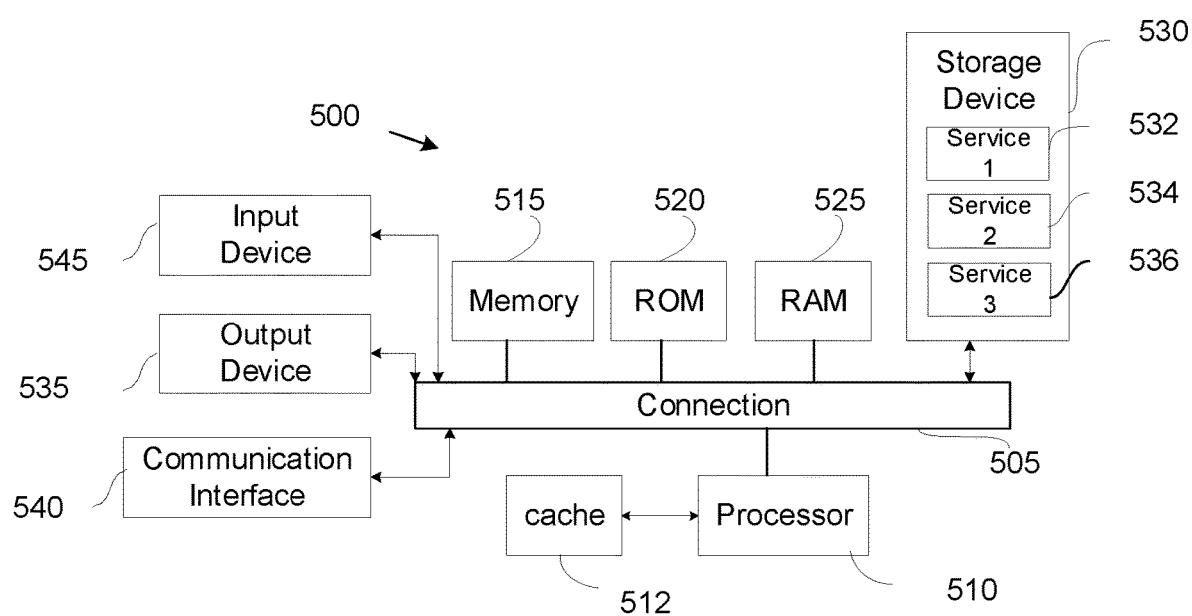
FIG. 5 shows an example of a system for implementing certain aspects of the present technology.

FIG. 5 shows an example of computing system 500, which can be for example any computing device making up autonomous vehicle 102, vector processing system 200, autonomous vehicle 402, local computing device 410, data center 450, client computing device 470, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A computer-implemented method comprising:
   receiving first sensor data corresponding with a first roadway segment;
   receiving second sensor data corresponding with a second roadway segment;
   encoding the first sensor data into a first vector, wherein the first vector represents a first roadway characteristic associated with the first roadway segment;
   encoding the second sensor data into a second vector, wherein the second vector represents a second roadway characteristic associated with the second roadway segment; and
   determining a similarity between the first roadway segment and the second roadway segment based on the first vector and the second vector by employing a vector manipulation; and
   clustering the first vector and the second vector upon determining the similarity between the first roadway segment and the second roadway segment, wherein the clustered first and second vectors are searchable to facilitate identification of the first and second roadway characteristic.

2. The computer-implemented method of claim 1, wherein the first sensor data and the second sensor data are perceived by sensors of an autonomous vehicle.

3. The computer-implemented method of claim 1, wherein the first sensor data is perceived by sensors of a first autonomous vehicle and the second sensor data is perceived by sensors of a second autonomous vehicle.

4. The computer-implemented method of claim 1, wherein the first roadway characteristic includes at least one of velocity of vehicles on the first roadway segment, density of vehicles on the first roadway segment, velocity of pedestrians on the first roadway segment, and density of pedestrians on the first road segment.

5. The computer-implemented method of claim 1, wherein the first roadway characteristic is associated with timestamp information.

6. The computer-implemented method of claim 1, wherein the first vector includes timestamp information.

7. A system comprising:
   a storage configured to store instructions; and
   a processor configured to execute the instructions and cause the processor to:
     receive first sensor data corresponding with a first roadway segment;
     receive second sensor data corresponding with a second roadway segment;
     encode the first sensor data into a first vector, wherein the first vector represents a first roadway characteristic associated with the first roadway segment;
     encode the second sensor data into a second vector, wherein the second vector represents a second roadway characteristic associated with the second roadway segment; and
     determine a similarity between the first roadway segment and the second roadway segment based on the first vector and the second vector by employing a vector manipulation; and
     cluster the first vector and the second vector upon determining the similarity between the first roadway segment and the second roadway segment, wherein the clustered first and second vectors are searchable to facilitate identification of the first and second roadway characteristic.

8. The system of claim 7, wherein the first sensor data and the second sensor data are perceived by sensors of an autonomous vehicle.

9. The system of claim 7, wherein the first sensor data is perceived by sensors of a first autonomous vehicle and the second sensor data is perceived by sensors of a second autonomous vehicle.

10. The system of claim 7, wherein the first roadway characteristic includes at least one of velocity of vehicles on the first roadway segment, density of vehicles on the first roadway segment, velocity of pedestrians on the first roadway segment, and density of pedestrians on the first road segment.

11. The system of claim 7, wherein the first roadway characteristic is associated with timestamp information.

12. The system of claim 7, wherein the first vector includes timestamp information.

13. A non-transitory computer readable medium comprising instructions, the instructions, when executed by a computing system, cause the computing system to:
    receive first sensor data corresponding with a first roadway segment;
    receive second sensor data corresponding with a second roadway segment;
    encode the first sensor data into a first vector, wherein the first vector represents a first roadway characteristic associated with the first roadway segment;
    encode the second sensor data into a second vector, wherein the second vector represents a second roadway characteristic associated with the second roadway segment; and
    determine a similarity between the first roadway segment and the second roadway segment based on the first vector and the second vector by employing a vector manipulation; and
    cluster the first vector and the second vector upon determining the similarity between the first roadway segment and the second roadway segment, wherein the clustered first and second vectors are searchable to facilitate identification of the first and second roadway characteristic.

14. The computer readable medium of claim 13, the first sensor data and the second sensor data are perceived by sensors of an autonomous vehicle.

15. The computer readable medium of claim 13, the first sensor data is perceived by sensors of a first autonomous vehicle and the second sensor data is perceived by sensors of a second autonomous vehicle.

16. The computer readable medium of claim 13, the first roadway characteristic includes at least one of velocity of vehicles on the first roadway segment, density of vehicles on the first roadway segment, velocity of pedestrians on the first roadway segment, and density of pedestrians on the first road segment.

17. The computer readable medium of claim 13, the first roadway characteristic is associated with timestamp information.

18. The computer readable medium of claim 13, the first vector includes timestamp information.

* * * * *